United States Patent
Evans, V et al.

(10) Patent No.: US 9,560,443 B1
(45) Date of Patent: Jan. 31, 2017

(54) MULTIPURPOSE AUDIO APPARATUS

(71) Applicant: Essential Products, Inc., Palo Alto, CA (US)

(72) Inventors: David John Evans, V, Palo Alto, CA (US); Xinrui Jiang, San Jose, CA (US); Andrew E. Rubin, Los Altos, CA (US); Matthew Hershenson, Los Altos, CA (US); Xiaoyu Miao, Palo Alto, CA (US)

(73) Assignee: Essential Products, Inc., Palo Alto, CA (US)

( * ) Notice: Subject to any disclaimer, the term of this patent is extended or adjusted under 35 U.S.C. 154(b) by 0 days.

(21) Appl. No.: 15/164,012

(22) Filed: May 25, 2016

Related U.S. Application Data

(60) Provisional application No. 62/318,159, filed on Apr. 4, 2016, provisional application No. 62/249,130, filed on Oct. 30, 2015.

(51) Int. Cl.
*H04R 1/02* (2006.01)
*H04R 1/34* (2006.01)

(52) U.S. Cl.
CPC .......... *H04R 1/345* (2013.01); *H04R 2420/09* (2013.01)

(58) Field of Classification Search
USPC ......................................................... 381/394
See application file for complete search history.

(56) References Cited

U.S. PATENT DOCUMENTS

| | | | | |
|---|---|---|---|---|
| 4,869,566 A | * | 9/1989 | Juso | G02B 6/3817 250/227.28 |
| 8,571,205 B2 | * | 10/2013 | Rosenblatt | H04N 5/2254 379/419 |
| 2012/0002097 A1 | * | 1/2012 | Rosenblatt | H04N 5/2254 348/335 |
| 2014/0193024 A1 | * | 7/2014 | Raff | H04R 1/02 381/394 |

* cited by examiner

*Primary Examiner* — Amir Etesam
(74) *Attorney, Agent, or Firm* — Perkins Coie LLP

(57) ABSTRACT

The technology presented here reduces the number of audio ports associated with the mobile device by combining a plurality of audio ports into a single multipurpose audio apparatus. The multipurpose audio apparatus includes the functionality of multiple audio ports that have previously required separate audio ports, such as an external device audio port and an audio emitter audio port. When the external device is plugged in, the audio emitter powers off, and the sound is omitted through the external device. When the external device is not plugged in, the audio emitter emits the sound.

9 Claims, 8 Drawing Sheets

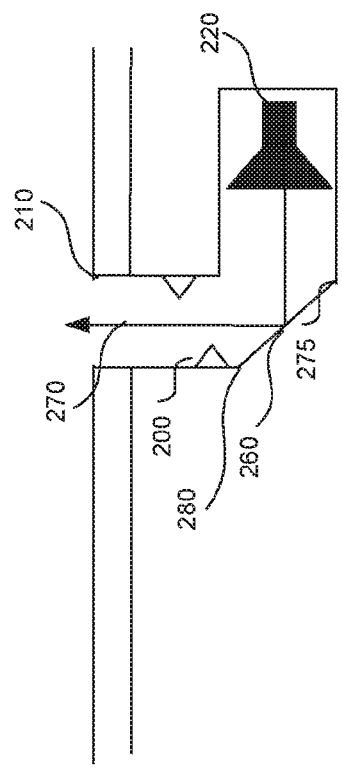
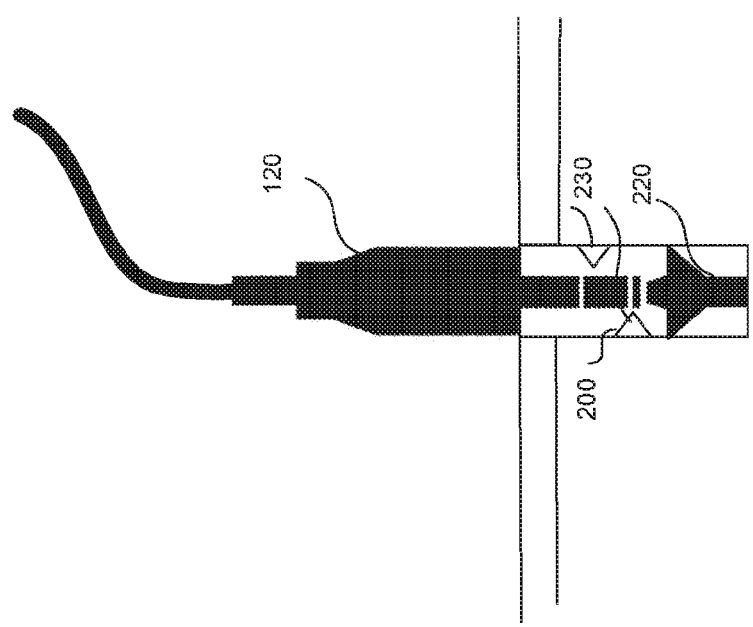
FIG. 2D
FIG. 2C

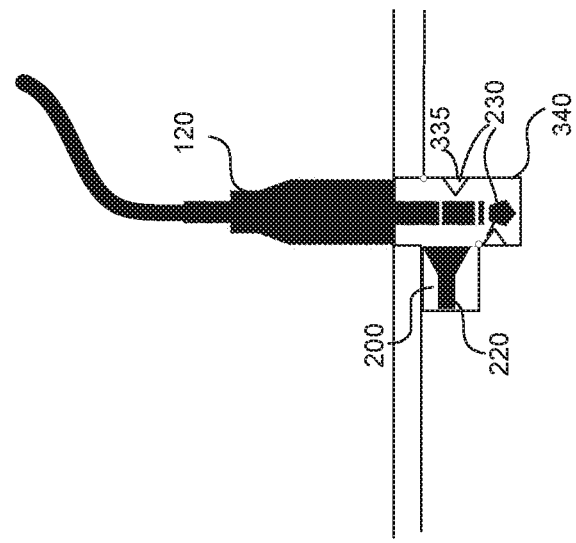
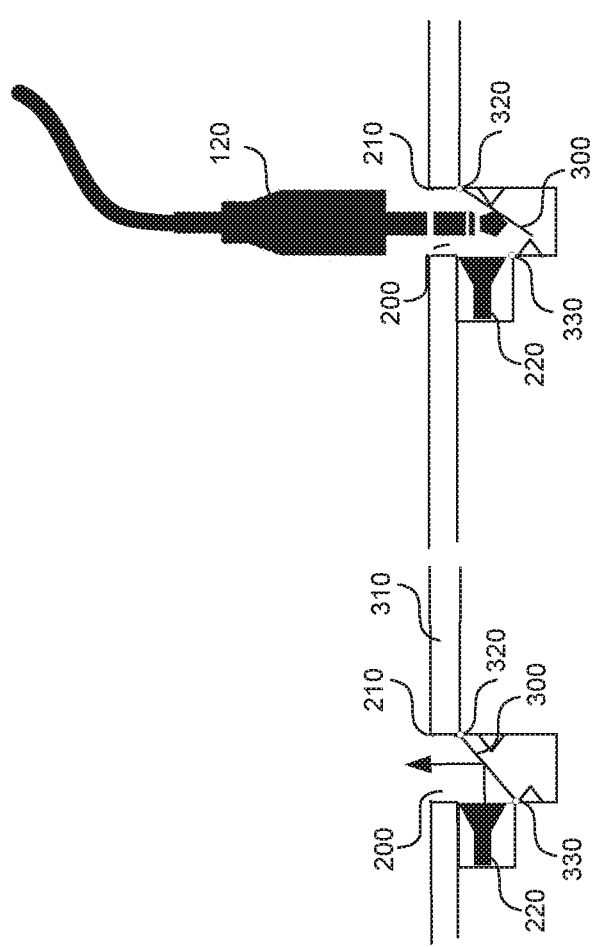
FIG. 3A   FIG. 3B   FIG. 3C

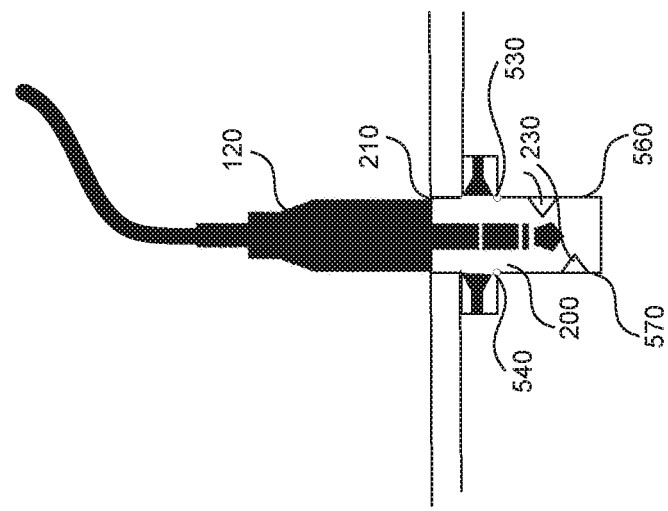
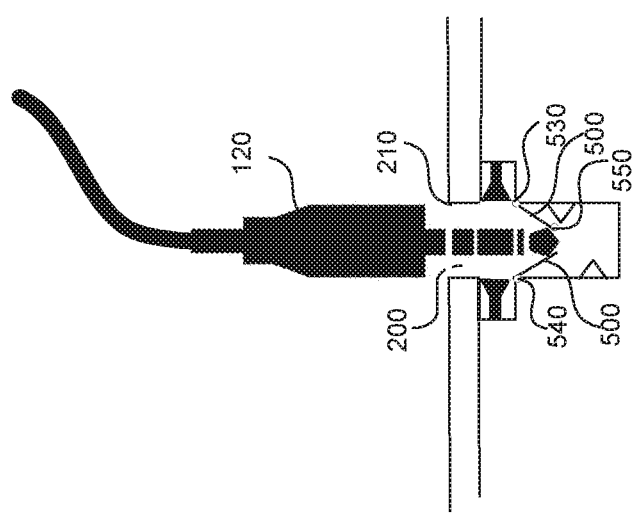
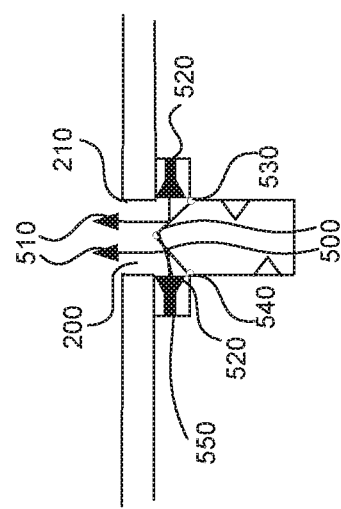
*FIG. 5C*
*FIG. 5B*
*FIG. 5A*

MULTIPURPOSE AUDIO APPARATUS

CROSS-REFERENCE TO RELATED APPLICATIONS

This application claims priority to the U.S. Provisional Patent Application Ser. No. 62/249,130, filed Oct. 30, 2015, and U.S. Provisional Patent Application Ser. No. 62/318,159, filed Apr. 4, 2016, all of which are incorporated herein by reference in their entirety.

TECHNICAL FIELD

The present application is related to mobile devices and, more specifically, to methods and systems that reduce the number of audio ports associated with the mobile device, by combining functionality of multiple audio ports into a single multipurpose audio apparatus.

BACKGROUND

Mobile devices contain a plurality of different audio ports, which correspond to a plurality of devices, such as the audio emitter, the external device, etc. Each audio apparatus requires a dedicated opening formed in the mobile device casing, a dedicated circuit on the motherboard, a dedicated wiring between the hole in the mobile device casing and the circuit on the motherboard, etc. Each additional audio apparatus increases the cost of manufacturing the mobile device. Further, each additional audio apparatus increases the probability of a foreign substance, such as dust or water, getting inside the mobile device and disrupting the operation of the mobile device circuitry.

SUMMARY

The technology presented here reduces the number of audio ports associated with the mobile device by combining a plurality of audio ports into a single multipurpose audio apparatus. The multipurpose audio apparatus includes the functionality of multiple audio ports that have previously required separate audio ports, such as an external device audio port and an audio emitter audio port. When the external device is plugged in, the audio emitter powers off, and the sound is emitted through the external device. When the external device is not plugged in, the audio emitter emits the sound.

BRIEF DESCRIPTION OF THE DRAWINGS

FIGS. 2A-2D show the cross-section of the multipurpose audio apparatus, according to various embodiments.

FIG. 3A shows the placement of the audio emitter close to the entry point associated with the acoustic chamber, according to one embodiment.

FIG. 3B shows the detachable junction and a hinge junction associated with the reflector, according to one embodiment.

FIG. 3C shows the reflector positioned to allow contact between the external device and the contacts associated with the audio apparatus, according to one embodiment.

FIG. 5A shows the placement of a stereo audio emitter close to the entry point associated with the acoustic chamber, according to one embodiment.

FIG. 5B shows the disengagement of the reflectors, according to one embodiment.

FIG. 5C shows the reflectors positioned to allow contact between the external device and the contacts associated with the audio apparatus, according to one embodiment.

DETAILED DESCRIPTION

The technology presented here reduces the number of audio ports associated with the mobile device by combining a plurality of audio ports into a single multipurpose audio apparatus. The multipurpose audio apparatus includes the functionality of multiple audio ports that have previously required separate audio ports, such as an external device audio port and an audio emitter audio port. When the external device is plugged in, the audio emitter powers off, and the sound is omitted through the external device. When the external device is not plugged in, the audio emitter emits the sound.

In various embodiments disclosed herein, a connector associated with the external device can be male, female, or androgynous.

Technology

Figure 1:
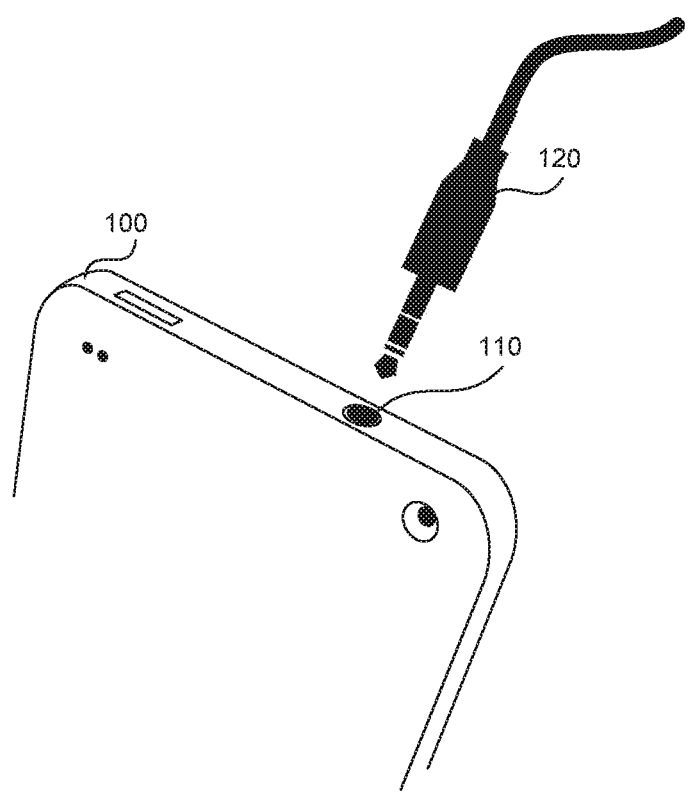
FIG. 1 shows a multipurpose audio apparatus associated with the mobile device, according to one embodiment.

FIG. 1 shows a multipurpose audio apparatus associated with the mobile device, according to one embodiment. The audio apparatus 110 is disposed on an enclosure associated with the mobile device 100. The audio apparatus 110 is configured to receive an external device 120, such as a headphone jack. The audio apparatus 110 can have a varying diameter such as 2.5 mm, 3.5 mm, 6.35 mm, etc., corresponding to the diameter of the external device 120. The audio apparatus 110 also includes an audio emitter inside the audio apparatus 110. Traditionally, the area of the audio emitter associated with the mobile device 100 is approximately 10 mm$^2$, which corresponds to the area of a headphone jack, $$\pi\left(\frac{3.5 \text{ mm}}{2}\right)^2 = 9.62 \text{ mm}^2.$$

In various embodiments, the area of the audio emitter varies with the varying diameter of the external device 120.

FIGS. 2A-2D show the cross section of the multipurpose audio apparatus, according to various embodiments. The audio apparatus 110 comprises an acoustic chamber 200. The acoustic chamber 200 includes an end point 225, an entry point 210, an audio emitter 220, an acoustic chamber passage that extends between the entry point 210 and the end point 225, and contacts 230 disposed within the acoustic chamber passage. The acoustic chamber 200 guides a sound wave between the end point 225 and the entry point 210. The acoustic chamber 200 also acts as a resonance chamber, amplifying the sound wave. The contacts 230, 335 in FIG. 3C can comprise any number of contacts such as 2, 3, 4, 5, 6 etc. corresponding to any number of electrical devices associated with the external device 120, for example, any number of headphone channels associated with the headphone jack. The contacts 230, 335 in FIG. 3C can be electrical, optical, acoustic, or any combination thereof. The acoustic chamber 200 is configured to guide sound from the audio emitter 220 to the entry point 210. The interior of the acoustic chamber 200 comprises a material that reflects sound.

In various embodiments presented herein, the contacts 230, 335 (in FIG. 3C) can establish an electrical, optical, and/or acoustic connection to the external device 120 when the external device 120 is inserted in the acoustic chamber 200. For example, the contacts 230, 335 (in FIG. 3C) can establish an optical connection to the external device 120 when the external device 120 comprises a TOSLINK cable. The external device 120 can be exclusively electrical, exclusively optical, acoustic, or can be a combination thereof.

According to one embodiment, when an external device 120 is disposed inside the entry point 210, the shape associated with the acoustic chamber 200 prevents contact between the external device 120 and the audio emitter 220. The shape of the acoustic chamber 200 can have a straight axis or a bent axis. When the acoustic chamber 200 has a straight axis, the length of the acoustic chamber 200 is greater than the length of the external device 120, so that the external device 120 does not reach the audio emitter 220. When the acoustic chamber 200 has a bent axis, the bend 240 of the acoustic chamber 200 can be sharp, as shown in the bend 240 in FIG. 2A, or rounded, as shown in the bend 240 in FIG. 2B. The degree of the bend 240 can vary from 0° to 180°. In another embodiment, the acoustic chamber 200 can include multiple bends; for example, the acoustic chamber 200 can be L-shaped, T-shaped, U-shaped, shaped like a cross, etc.

In various embodiments disclosed herein, the acoustic chamber 200 comprises a waterproof membrane 250 disposed between the contacts 230 and the audio emitter 220. The waterproof membrane 250 can be retractable. The acoustic chamber 200 can include a waterproof coating disposed on an outside surface and/or an inside surface associated with the acoustic chamber 200.

The audio emitter 220 is associated with the end point 225 of the acoustic chamber 200. The audio emitter 220 is configured to emit an audio signal. The audio emitter 220, 520 (in FIG. 5A) can be any type of audio emitter a transducer, a piezoelectric audio emitter, etc. The audio emitter 220, 520 (in FIG. 5A) can be any type of audio emitter tuned to a specific frequency, such as a subwoofer, a woofer, a tweeter, etc. The audio emitter 220 is operable to turn off when the external device is disposed inside the entry point 210. The audio emitter 220 can be turned off in software or in hardware. In one embodiment, a software program running on a processor associated with the mobile device can receive a signal that the external device 120 is inserted in the audio apparatus 110, and can send a control signal to the audio emitter 220 to turn off. In another embodiment, once the contacts 230 establish a connection with the external device 120, the audio emitter 220 turns off.

The entry point 210 includes an opening disposed on a surface associated with the mobile device 100. The opening is operable to emit the audio signal, and the opening is operable to receive the external device 120. The opening can receive a stereo external device or a mono external device. The opening can receive an external device 120 having a diameter of 2.5 mm, 3.5 mm, 6.35 mm, etc.

According to another embodiment, shown in FIG. 2C, the acoustic chamber 200 has a straight axis that enables the external device 120 to plug into the audio emitter 220. When the external device 120 is plugged into the audio emitter 220, the audio emitter 220 turns off, and the sound is transmitted through the external device 120. According to one embodiment, the waterproof membrane 250 can be configured to retract when the external device 120 is plugged into the audio emitter 220. The waterproof membrane 250 can be actuated by, or can be a part of, a very small device, such as a micro-electromechanical systems ("MEMS") device, a nano-electromechanical systems ("NEMS") device, a pico-electromechanical systems device, etc.

Figure 2B:
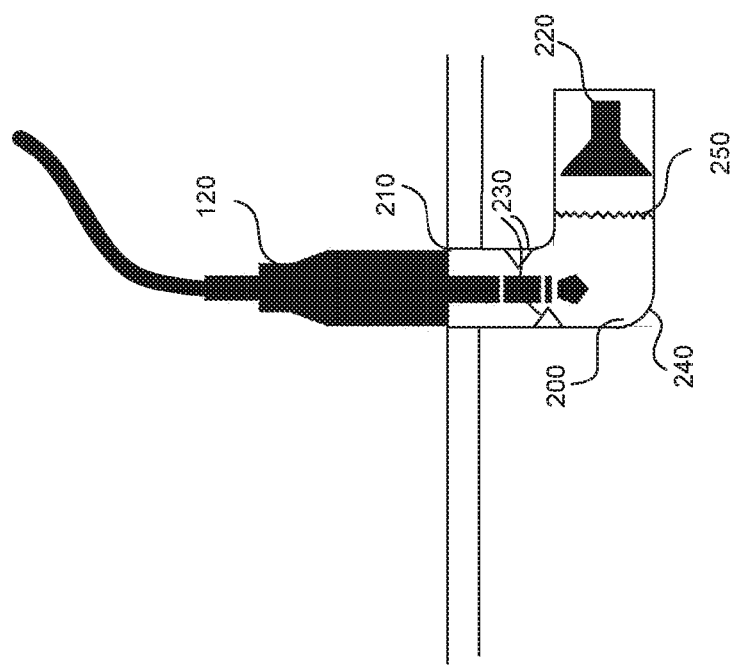
Figure 2A:
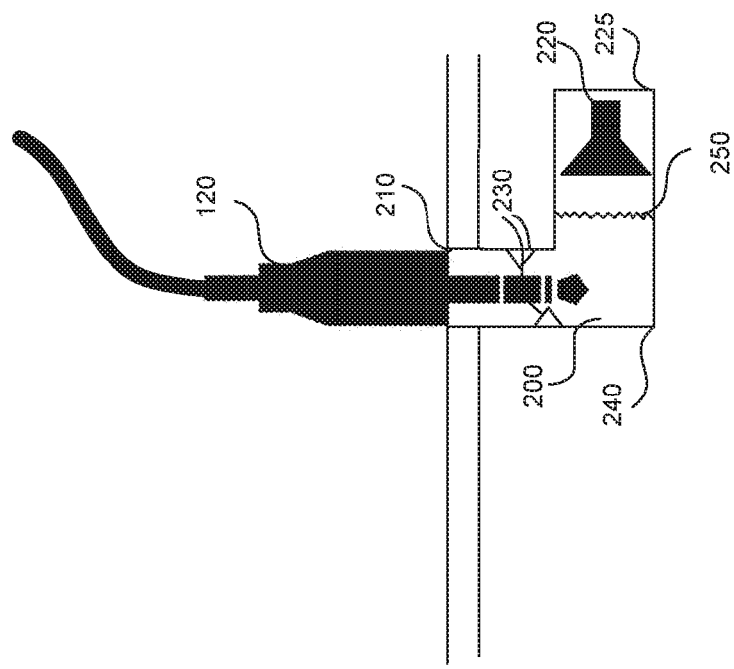

According to another embodiment, shown in FIG. 2D, the acoustic chamber 200 comprises a slanted reflector 260. The reflector 260 is configured to reflect the sound coming from the audio emitter 220 and send it along the path 270 toward the entry point 210. The reflector 260 is disposed at an angle approximately 135° to the path of the sound associated with the audio emitter 220. The angle of the reflector 260 can vary from 120° to 150°. In various embodiments described herein, the reflector 260, 300, 500, 600 can join the acoustic chamber 200 at a sharp angle 275, 280 (in FIG. 2D). Alternatively, one or both of the angles 275, 280 (in FIG. 2D) associated with the reflector 260, 300, 500, 600 can be rounded, similar to the rounded bend 240 shown in FIG. 2B.

FIG. 3A shows the placement of the audio emitter 220 close to the entry point 210 associated with the acoustic chamber 200, according to one embodiment. The audio emitter 220 can be placed beneath the mobile device case 310, as shown in FIG. 3A, or the audio emitter 220 can be placed some distance apart, to create a T-shaped acoustic chamber 200. The acoustic chamber 200 can optionally include a reflector 300. The reflector 300 is configured in a manner similar to reflector 260, described above. The reflector 300 joins the acoustic chamber 200 at two junctions 320, 330. According to one embodiment, one junction is detachable, and the other junction acts as a hinge. In various embodiments described herein, the hinge can be a spring-loaded hinge.

FIG. 3B shows the detachable junction 330 and a hinge junction 320 associated with the reflector 300, according to one embodiment. Alternatively, the detachable junction can be 320, and a hinge junction can be 330. When the external device 120 is inserted in the acoustic chamber 200, the external device 120 causes the reflector 300 to detach at the detachable junction 330, while the hinge junction 320 rotates to position the reflector 300 away from the external device 120. According to one embodiment, the reflector 300 is actuated by, or can be a part of, a very small device, such as a MEMS device, a NEMS device, a pico-electromechanical systems device, etc.

FIG. 3C shows the reflector 300 positioned to allow contact between the external device 120 and the contacts 230, according to one embodiment. According to one embodiment, when the external device 120 is inserted in the acoustic chamber 200, the reflector 300 flattens against a wall 340 associated with the acoustic chamber 200.

In one embodiment, the reflector 300, in addition to flattening against the wall 340, also retracts, to allow the external device 120 to establish contact with the contact 335. According to another embodiment, the reflector 300 establishes contact with the contact 335 and the external device 120, thus allowing communication between the contact 335 and the external device 120. In this embodiment, the reflector 300 is made out of a conductive material.

According to another embodiment, the reflector 300 comprises a movable part that, when pushed out by the contact 335, allows the contact 335 to reach the external device 120.

In various embodiments described herein, the reflector can be actuated by, or can be a part of, a very small device, such as a MEMS device, a NEMS device, a pico-electromechanical systems device, etc.

When the external device 120 disengages from the acoustic chamber 200, the reflector 300 resumes the position shown in FIG. 3A. The motion of the reflector 300 can be activated by the release of the pressure exerted by the external device 120, by an electromechanical device, etc.

Figure 4B:
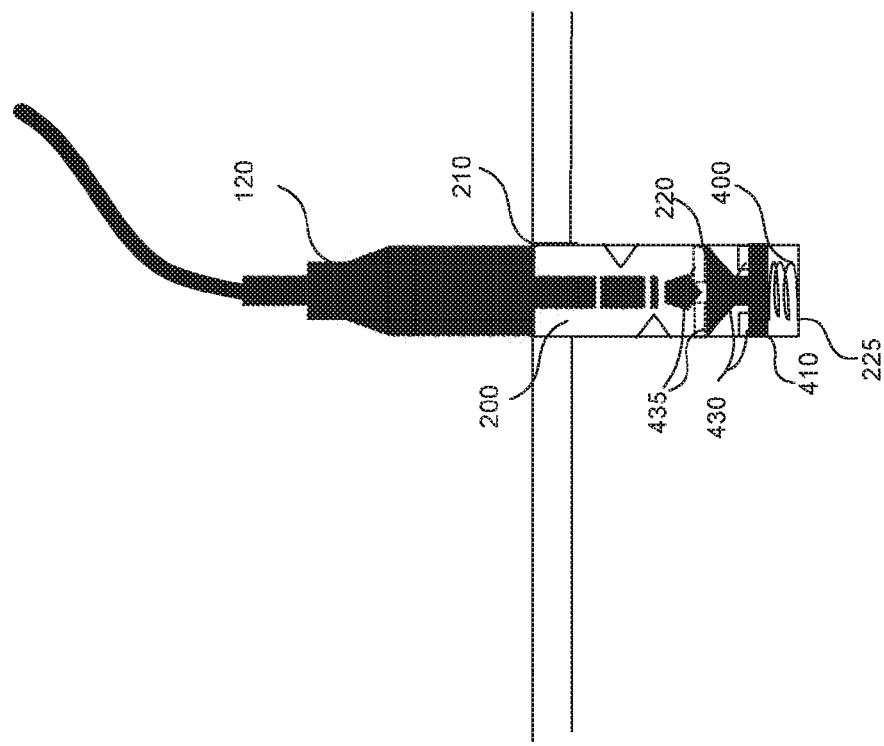
FIG. 4B shows the retracted position associated with the movable audio emitter, according to one embodiment.
Figure 4A:
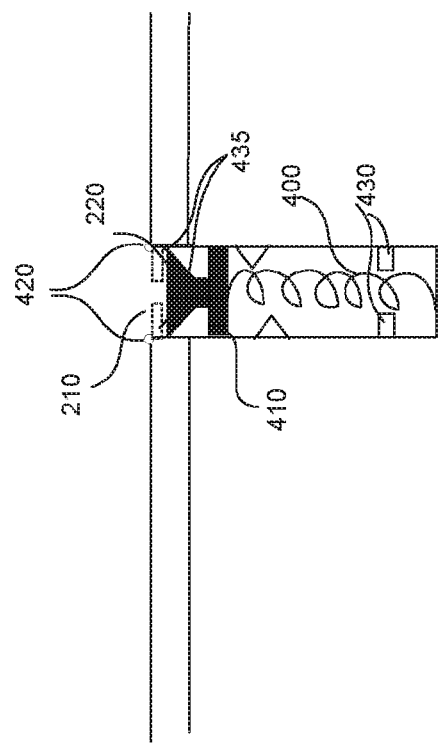
FIG. 4A shows a movable audio emitter, according to one embodiment.

FIG. 4A shows a movable audio emitter 220, according to one embodiment. When the external device 120 is not inserted into the entry point 210, a spring 400, when at rest, positions the audio emitter 220 proximate to the entry point 210. The spring 400 can be attached to the platform 410, which in turn is attached to the audio emitter 220, or the spring 400 can be directly attached to the audio emitter 220.

One skilled in the art will appreciate that, instead of the spring 400, various other movement mechanisms can be employed. For example, a linear rack built into the mobile device case can be used to lower or extend the audio emitter 220. In other embodiments, the audio emitter 220 can be actuated by, or can be a part of, a very small device, such as a MEMS device, a NEMS device, a pico-electromechanical systems device, etc.

The movement mechanism can be activated by the pressure created when the external device 120 is inserted into the entry point 210. In one embodiment, the external device 120 plugs into the audio emitter 220 and pushes the audio emitter 220 into its retracted position, shown in FIG. 4B. In another embodiment, the external device 120 exerts pressure against surfaces 435 disposed between the audio emitter 220 and the entry point 210. In another embodiment, a detector 420 placed at the entry point 210 detects when the external device 120 is inserted into the entry point 210 and activates the movement mechanisms, such as the spring 400, the linear rack, an electromechanical device, etc.

FIG. 4B shows the retracted position associated with the movable audio emitter, according to one embodiment. The spring 400 is held in the retracted position by two locks 430, which hold the platform 410 in place, proximate to the end point 225 associated with the acoustic chamber 200. The two locks 430 are movable, to allow the platform 410 to pass beneath the locks 430, and to allow the platform 410 to disengage from the locks 430. When the movement mechanism comprises a linear rack built into the mobile device case, the locks 430 are placed inside the mobile device case. In another embodiment, the spring 400 is held in the retracted position by the pressure of the external device 120 against the surfaces 435. In other embodiments, the locks 430 and/or surfaces 435 can be actuated by, or can be a part of, a very small device, such as a MEMS device, a NEMS device, a pico-electromechanical systems device, etc.

When the external device 120 is removed from the acoustic chamber 200, the movement mechanism goes from the retracted position to the extended position. The movement mechanism can be activated in various ways, such as when the pressure exerted by the external device 120 is reduced, when the detectors 420 determine that the external device 120 is no longer inside the entry point 210, when the external device 120 pulls up the audio emitter 220 plugged into the external device 120, etc.

FIG. 5A shows the placement of a stereo audio emitter 520 close to the entry point 210 associated with the acoustic chamber 200, according to one embodiment. Two audio emitters 520 can be disposed on opposite sides of the acoustic chamber 200, or can be disposed proximate to each other. Two reflectors 500 reflect the sound coming from two audio emitters 520, along the paths 510, and out of the entry point 210. The reflectors 500 join the acoustic chamber 200 at two junctions 530, 540. The two reflectors 500 join each other at the junction 550. The reflectors 500 can disengage and enable the external device 120 to enter the acoustic chamber 200 in various ways.

FIG. 5B shows the disengagement of the reflectors 500, according to one embodiment. When the external device 120 is inserted into the entry point 210, the reflectors 500 disengage at junction 550. The hinges at junctions 530, 540 allow the reflectors to rotate away from the external device 120. In various embodiments presented herein, the reflectors 500 are actuated by, or can be a part of, a very small device, such as a MEMS device, a NEMS device, a pico-electromechanical systems device, etc.

In one embodiment, not pictured, junction 540 disengages from the acoustic chamber 200, and junction 530 acts as a hinge. Junction 550 enables the reflector 500 to fold. In another embodiment, not pictured, junction 530 disengages from the acoustic chamber 200 and junction 540 acts as a hinge, while junction 550 enables the reflector 500 to fold.

FIG. 5C shows the reflectors 500 positioned to allow contact between the external device 120 and the contacts 230, according to one embodiment. According to one embodiment, when the external device 120 is inserted in the acoustic chamber 200, the reflectors 500 (in FIG. 5A) disengage at junction 550 (in FIG. 5A) and flatten against the walls 560, 570 of the acoustic chamber 200. According to another embodiment, when the external device 120 is inserted in the acoustic chamber 200, the reflectors disengage at junction 530 and flatten against the wall 570, or the reflectors disengage at junction 540 and flatten against the wall 560.

In one embodiment, the reflectors 500, in addition to flattening against the walls of the acoustic chamber 200, also retract, to allow the external device 120 to establish a contact with the contacts 230. According to another embodiment, the reflectors 500 establish contact with the contacts 230 and the external device 120, thus allowing communication between the contacts 230 and the external device 120. In this embodiment, the reflectors 500 are made out of a conductive material.

According to another embodiment, the reflectors 500 comprise a movable part that, when pushed out by the contacts 230, allows the contacts 230 to reach the external device 120. In various embodiments described herein, the reflector can be actuated by, or can be a part of, a very small device, such as a MEMS device, a NEMS device, a pico-electromechanical systems device, etc.

When the external device 120 disengages from the acoustic chamber 200, the reflectors 500 resume the position shown in FIG. 5A. The motion of the reflectors 500 can be activated by the spring-loaded hinge at one of the junctions 530, 540, by the release of the pressure exerted by the external device 120, by an electromechanical device, etc.

Figure 6B:
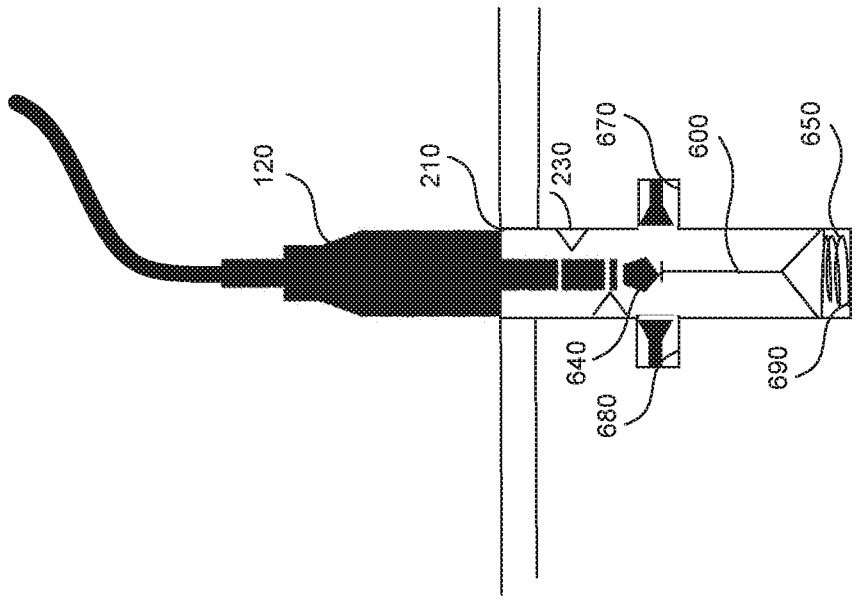
FIG. 6B shows the retracted position associated with the reflector, according to one embodiment.
Figure 6A:
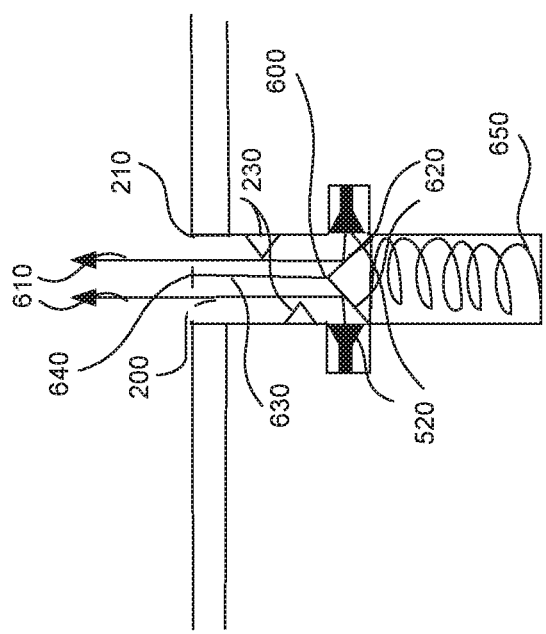
FIG. 6A shows the placement of a stereo audio emitter inside the acoustic chamber, according to one embodiment.

FIG. 6A shows the placement of a stereo audio emitter 520 inside the acoustic chamber 200, according to one embodiment. Two audio emitters 520 can be disposed on opposite sides of the acoustic chamber 200, and are associated with the end points 670, 680 in FIG. 6B. The two audio emitters 520 can be disposed proximate to each other. The reflector 600 reflects the sound coming from two audio emitters 520, along the paths 610, and out of the entry point 210.

The reflector 600 comprises two surfaces 620 disposed at an angle approximately 135° to the path of the sound associated with the audio emitters 520. The angle of the reflector 600 can vary from 120° to 150°. The reflector 600 further comprises a surface 630 axially aligned with the acoustic chamber 200, wherein the surface 630 separates the acoustic chamber 200 into two acoustic chambers corresponding to each of the audio emitters 520. In addition, the reflector 600 comprises a surface 640 perpendicular to the axis associated with the acoustic chamber 200.

When the external device 120 is not inserted into the entry point 210, a spring 650, when at rest, positions the reflector 600 so that the surface 640 associated with the reflector 600 is disposed near the entry point 210. The spring 650 is associated with the end point 690 in FIG. 6B.

One skilled in the art will appreciate that, instead of the spring 650, various other movement mechanisms can be employed. For example, a linear rack built into the mobile device case can be used to lower or extend the reflector 600. In other embodiments, the reflector 600 can be actuated by, or can be a part of, a very small device, such as a MEMS device, a NEMS device, a pico-electromechanical systems device, etc.

The movement mechanism can be activated by the pressure created when the external device 120 is inserted into the entry point 210. In one embodiment, a detector placed at the entry point 210 detects when the external device 120 is inserted into the entry point 210 and activates the movement mechanisms, such as the spring 650, the linear rack, an electromechanical device, etc.

FIG. 6B shows the retracted position associated with the reflector 600, according to one embodiment. The spring 650 can be held in the retracted position either by the pressure exerted by the external device 120 against surface 640, or by a lock, similar to lock 430 in FIGS. 4A-4B.

When the external device 120 is removed from the acoustic chamber 200, the movement mechanism goes from the retracted position to the extended position. The movement mechanism can be activated in various ways, such as when the pressure exerted by the external device 120 is reduced and the spring 650 goes back to the rest position, when the detector associated with the entry point 210 determines that the external device 120 is no longer inside the entry point 210, etc.

Figure 7:
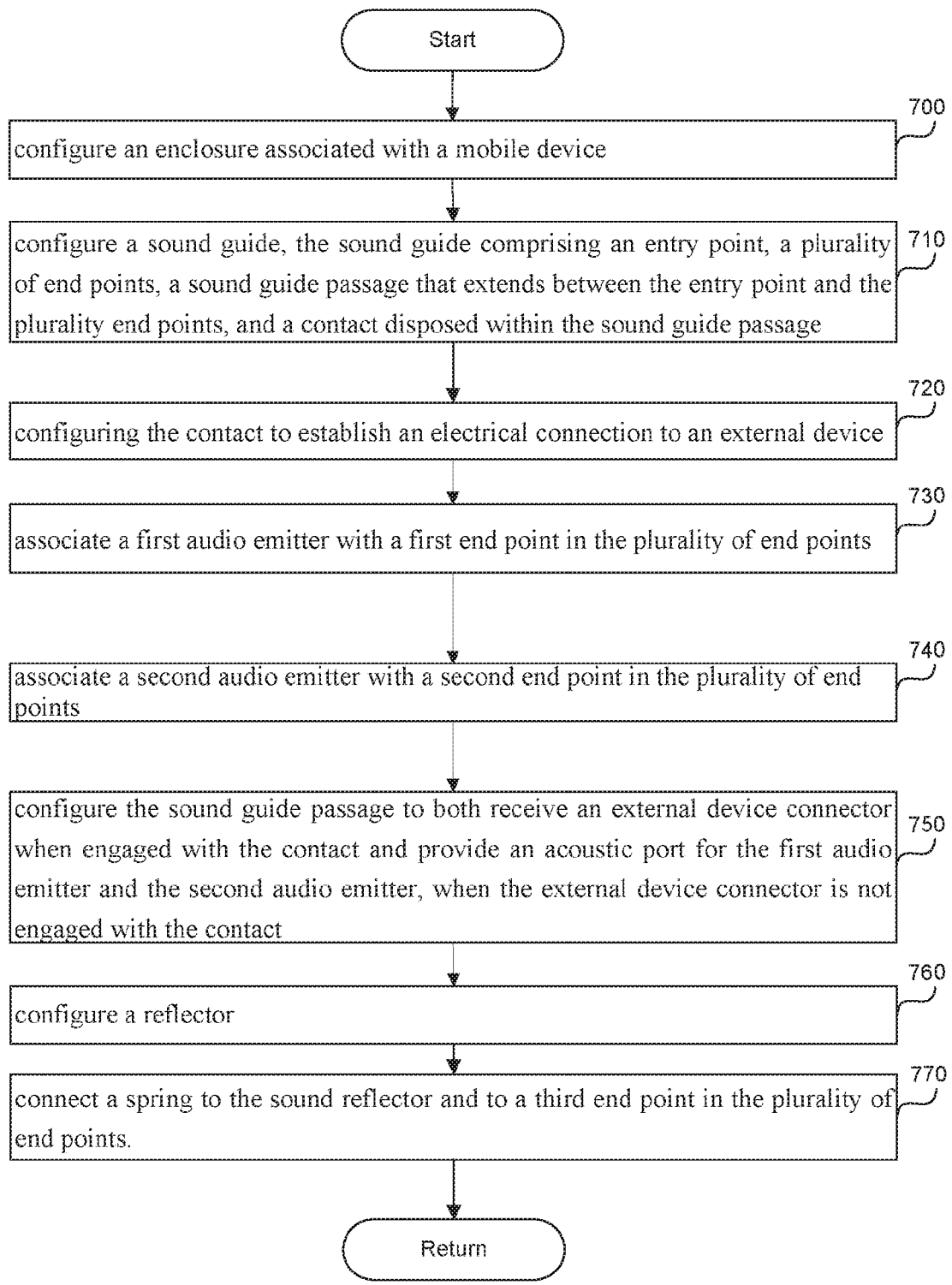
FIG. 7 is a flowchart of a method to assemble a multipurpose audio apparatus, according to one embodiment.

FIG. 7 is a flowchart of a method to assemble a multipurpose audio apparatus, according to one embodiment. In step 700, an enclosure associated with the mobile device 100 is configured. In step 710, an acoustic chamber 200 is configured to include entry point 210 formed through an exterior surface of the enclosure, a plurality of end points such as 670, 680, 690 in FIG. 6B within the enclosure, an acoustic chamber passage that extends between the entry point 210 and the plurality of end points such as 670, 680, 690 in FIG. 6B, and a contact disposed within the acoustic chamber passage.

In step 720, the contact 230 is configured to establish an electrical and/or optical connection to an external device 120, when a connector associated with the external device is inserted through the entry point 210 into the acoustic chamber passage and engaged with the contact 230, 335.

In step 730, a first audio emitter is associated with a first end point in the plurality of end points such as 670, 680, 690 in FIG. 6B. The first audio emitter is configured to emit a first audio signal.

In step 740, a second audio emitter is associated with a second end point in the plurality of end points such as 670, 680, 690 in FIG. 6B. The second audio emitter is configured to emit a second audio signal. The second audio emitter can be disposed opposite the first audio emitter, or proximate to the first audio emitter.

In step 750, the acoustic chamber passage is configured to both receive an external device connector when engaged with the contact 230, 335, and provide an acoustic port for the first audio emitter and the second audio emitter 520, when the external device connector is not engaged with the contact 230, 335.

In step 760, a reflector is configured, which includes angularly disposing a first and second surface; connecting a third surface 630 to the first and second surface; and connecting a fourth surface 640 to the third surface 630. The first surface is angularly disposed with respect to an axis associated with the first audio emitter. The first surface is configured to deflect the first audio signal toward the entry point 210 associated with the acoustic chamber. The second surface is angularly disposed with respect to an axis associated with the second audio emitter. The second surface is configured to deflect the second audio signal toward the entry point 210 associated with the acoustic chamber.

The third surface 630 is disposed parallel to an axis associated with the acoustic chamber. The third surface 630 guides the first audio signal and the second audio signal to the entry point 210 associated with the acoustic chamber 200. The fourth surface 640 is perpendicular to a first end associated with the third surface 630 and moves rigidly in response to pressure changes exerted against the fourth surface 640.

In step 770, a spring 650 is connected to the reflector and to a third end point in the plurality of end points such as 670, 680, 690 in FIG. 6B, wherein the spring 650 is configured to compress and to extend in response to pressure changes.

In various embodiments, additional method steps can be performed to enable the creation of the embodiments described above.

Remarks

The language used in the specification has been principally selected for readability and instructional purposes, and it may not have been selected to delineate or circumscribe the inventive subject matter. It is therefore intended that the scope of the invention be limited not by this Detailed Description, but rather by any claims that issue on an application based hereon. Accordingly, the disclosure of various embodiments is intended to be illustrative, but not limiting, of the scope of the embodiments, which is set forth in the following claims.

The invention claimed is:

1. A mobile device comprising:
an enclosure;
an acoustic chamber, the acoustic chamber comprising an entry point formed through an exterior surface of the enclosure, an end point within the enclosure, an acoustic chamber passage that extends between the entry point and the end point, and a contact disposed within the acoustic chamber passage;
the contact establishing a connection with an external device, when a connector associated with the external device is inserted through the entry point into the acoustic chamber passage and engaged with the contact therein;
an audio emitter associated with the acoustic chamber passage, wherein operation of the audio emitter is disabled in response to engagement of an external device connector with the contact within the acoustic chamber passage;
wherein the acoustic chamber passage both receives the external device connector when engaged with the contact and provides an acoustic port for the audio emitter when the external device connector is not engaged with the contact;

a reflector disposed within the acoustic chamber passage, the reflector directing sound generated by the audio emitter along the acoustic chamber passage toward the entry point, the reflector comprising:

a first junction, the first junction comprising a spring-loaded hinge, the spring-loaded hinge connecting the reflector to the acoustic chamber, and the spring-loaded hinge operable to rotate the reflector in response to pressure changes exerted against the reflector; and a second junction connected to the acoustic chamber and operable to disengage from the acoustic chamber when pressure is exerted against the reflector.

2. The mobile device of claim 1, when the external device is inserted into the acoustic chamber passage, the reflector connecting the external device connector and the contact.

3. The mobile device of claim 1, when the external device is inserted in the acoustic chamber passage, the reflector operable to retract and to enable the external device connector to establish the connection with the contact.

4. A mobile device comprising:

an enclosure;

an acoustic chamber, the acoustic chamber comprising an entry point formed through an exterior surface of the enclosure, an end point within the enclosure, an acoustic chamber passage that extends between the entry point and the end point, and a contact disposed within the acoustic chamber passage;

the contact establishing a connection with an external device, when a connector associated with the external device is inserted through the entry point into the acoustic chamber passage and engaged with the contact therein;

an audio emitter associated with the acoustic chamber passage, wherein operation of the audio emitter is disabled in response to engagement of an external device connector with the contact within the acoustic chamber passage, the audio emitter disposed on a movable mechanism associated with the acoustic chamber, the movable mechanism operable to place the audio emitter proximate to the entry point, and the movable mechanism operable to place the audio emitter proximate to the end point; and wherein the acoustic chamber passage both receives the external device connector when engaged with the contact and provides an acoustic port for the audio emitter when the external device connector is not engaged with the contact.

5. The mobile device of claim 4, the movable mechanism comprising:

a first surface disposed between the audio emitter and the entry point, the first surface comprising an opening allowing an audio signal to pass between the audio emitter and the entry point, the first surface rigidly connected to the audio emitter, the first surface operable to move in response to pressure changes; and a spring connecting the end point associated with the acoustic chamber and the audio emitter, the spring operable to compress and extend in response to pressure changes.

6. A mobile device, comprising:

an enclosure;

an acoustic chamber, the acoustic chamber comprising an entry point formed through an exterior surface of the enclosure, an end point within the enclosure, an acoustic chamber passage that extends between the entry point and the end point, and a contact disposed within the acoustic chamber passage;

the contact establishing a connection with an external device, when an external device connector is inserted through the entry point into the acoustic chamber passage and engaged with the contact therein;

wherein the acoustic chamber passage both receives the external device connector when engaged with the contact and provides an acoustic port for a first audio emitter and a second audio emitter when the external device connector is not engaged with the contact;

the first audio emitter proximate to the entry point, wherein operation of the first audio emitter is disabled in response to engagement of the external device connector with the contact within the acoustic chamber passage;

the second audio emitter proximate to the entry point, wherein operation of the second audio emitter is disabled in response to engagement of the external device connector with the contact within the acoustic chamber passage;

a first reflector angularly disposed with respect to an axis associated with the first audio emitter, the first reflector deflecting an audio signal associated with the first audio emitter toward the entry point associated with the acoustic chamber, the first reflector comprising:

a first junction comprising a first spring-loaded hinge, the first spring-loaded hinge connecting the first reflector to the acoustic chamber, the first spring-loaded hinge operable to rotate the first reflector in response to pressure changes exerted against the first reflector;

a second junction, the second junction connected to a second reflector and operable to disengage from the second reflector when pressure is exerted against the first reflector;

the second reflector angularly disposed with respect to an axis associated with the second audio emitter, the second reflector deflecting the audio signal associated with the second audio emitter toward the entry point associated with the acoustic chamber, the second reflector comprising:

a third junction comprising a third spring-loaded hinge, the third spring-loaded hinge connecting the second reflector to the acoustic chamber, the third spring-loaded hinge operable to rotate the second reflector in response to pressure changes exerted against the second reflector; and a fourth junction, the fourth junction connected to the first reflector and operable to disengage from the first reflector when pressure is exerted against the second reflector.

7. The mobile device of claim 6, the first audio emitter tuned to emit low frequencies, and the second audio emitter tuned to emit high frequencies.

8. A mobile device, comprising:

an enclosure;

an acoustic chamber, the acoustic chamber comprising an entry point formed through an exterior surface of the enclosure, an end point within the enclosure, an acoustic chamber passage that extends between the entry point and the end point, and a contact disposed within the acoustic chamber passage;

the contact establishing a connection with an external device, when an external device connector is inserted through the entry point into the acoustic chamber passage and engaged with the contact therein;

wherein the acoustic chamber passage both receives the external device connector when engaged with the contact and provides an acoustic port for a first audio emitter and a second audio emitter when the external device connector is not engaged with the contact;

the first audio emitter operable to emit a first audio signal, wherein operation of the first audio emitter is disabled in response to engagement of the external device connector with the contact within the acoustic chamber passage;

the second audio emitter operable to emit a second audio signal, wherein operation of the second audio emitter is disabled in response to engagement of the external device connector with the contact within the acoustic chamber passage;

a reflector comprising:
- a first surface angularly disposed with respect to an axis associated with the first audio emitter, the first surface deflecting the first audio signal toward the entry point associated with the acoustic chamber;
- a second surface angularly disposed with respect to an axis associated with the second audio emitter, the second surface deflecting the second audio signal toward the entry point associated with the acoustic chamber;
- a third surface, connected to the first surface and the second surface, disposed parallel to an axis associated with the acoustic chamber, the third surface guiding the first audio signal and the second audio signal to the entry point associated with the acoustic chamber;
- a fourth surface, connected to the third surface, the fourth surface disposed perpendicular to the third surface, the fourth surface receiving pressure exerted by the external device, when the external device is inserted into the entry point associated with the acoustic chamber; and a spring connected to the reflector and to the end point associated with the acoustic chamber, the spring operable to compress and extend in response to pressure changes.

9. The mobile device of claim 8, the first audio emitter tuned to emit low frequencies, and the second audio emitter tuned to emit high frequencies.

* * * * *